United States Patent [19]

D'Haese

[11] Patent Number: 5,380,779

[45] Date of Patent: Jan. 10, 1995

[54] PRESSURE SENSITIVE ADHESIVE COMPOSITION WHICH IS REPULPABLE UNDER ACIDIC PH CONDITIONS

[75] Inventor: Francois C. D'Haese, Gent, Belgium

[73] Assignee: Minnesota Mining and Manufacturing Company, St. Paul, Minn.

[21] Appl. No.: 215,211

[22] Filed: Mar. 21, 1994

Related U.S. Application Data

[63] Continuation of Ser. No. 763,823, Sep. 23, 1991, abandoned.

[51] Int. Cl.$^6$ ............... C08L 79/04; C08F 128/02; C08F 20/10
[52] U.S. Cl. ............... 524/272; 524/141; 524/377; 524/516; 524/547; 524/548; 525/186; 526/287; 526/320; 526/318.41; 428/355
[58] Field of Search ............... 524/141, 187, 377, 547, 524/548, 516, 272; 525/186; 526/287, 320, 318.41; 428/355, 356

[56] References Cited

U.S. PATENT DOCUMENTS

| | | | |
|---|---|---|---|
| 2,838,421 | 6/1958 | Sohl | 117/122 |
| 3,096,202 | 7/1963 | DeGroot Von Arx | 117/68.5 |
| 3,152,940 | 10/1964 | Abel et al. | 156/157 |
| 3,321,451 | 5/1967 | Gander | 260/79.3 |
| 3,441,430 | 4/1969 | Peterson | 117/68.5 |
| 3,763,071 | 10/1973 | Katzer et al. | 524/377 |
| 3,763,117 | 10/1973 | McKenna et al. | 260/78.5 |
| 3,865,770 | 2/1975 | Blake | 260/27 R |
| 3,890,292 | 6/1975 | Bohme et al. | 260/80 |
| 4,033,918 | 7/1977 | Hauber | 260/29.6 |
| 4,341,860 | 7/1982 | Hauber et al. | 525/329 |
| 4,352,359 | 10/1982 | Larimore et al. | 128/640 |
| 4,388,432 | 6/1983 | Eskay | 524/388 |
| 4,413,080 | 11/1983 | Blake | 524/187 |
| 4,413,082 | 11/1983 | Gleichenhagen et al. | 524/243 |
| 4,442,258 | 4/1984 | Sunakawa et al. | 524/767 |
| 4,443,576 | 4/1984 | Bhattacharyya et al. | 526/320 |
| 4,539,996 | 9/1985 | Engel | 128/640 |
| 4,569,960 | 2/1986 | Blake | 524/145 |
| 4,728,568 | 3/1988 | Sasada et al. | 428/349 |

FOREIGN PATENT DOCUMENTS

| | | | |
|---|---|---|---|
| 0147067 | 7/1985 | European Pat. Off. | C09J 3/14 |
| 0172724 | 2/1986 | European Pat. Off. | C08F 2/32 |
| 0297451 | 1/1990 | European Pat. Off. | C08J 3/18 |
| 0352442 | 1/1990 | European Pat. Off. | C09J 133/14 |
| 0379932 | 8/1990 | European Pat. Off. | |
| 2142770 | 3/1973 | Germany | |

Primary Examiner—Paul R. Michl
Assistant Examiner—LaVonda R. DeWitt
Attorney, Agent, or Firm—Gary L. Griswold; Walter N. Kirn; James V. Lilly

[57] ABSTRACT

A pressure sensitive adhesive composition is described which is water-dispersible under acidic conditions. The composition comprises a terpolymer of a hydrophobic monomeric acrylic or methacrylic ester of a non-tertiary alcohol (monomer A); a polar monomer copolymerizable with said A monomer and having carboxylic, sulfonic acid or hydroxyl functionality or combinations thereof (monomer B); and a water soluble or water-dispersible macromolecular monomer of the formula X—Y—Z which is copolymerizable with A and B wherein X is a copolymerizable moiety containing a double bond, Y is a divalent linking group and Z is a water-dispersible polymeric moiety (monomer C). The combined acid groups employed in the B monomer are neutralized from 5 to 100% based on the total amount of acid groups in B. The composition further comprises tackifier and/or plasticizers at a level such that the ratio of terpolymer to additives falls within a range of from 0.2:1 to 5:1. The pressure sensitive adhesive composition is dispersible under a variety of pH conditions. Also described are tapes comprising the repulpable composition of the invention and their use in papermaking industry.

20 Claims, No Drawings

20

PRESSURE SENSITIVE ADHESIVE COMPOSITION WHICH IS REPULPABLE UNDER ACIDIC PH CONDITIONS

This is a continuation of application Ser. No. 07/763,823 filed Sep. 23, 1991, which is now abandoned.

FIELD OF THE INVENTION

This invention relates to repulpable pressure sensitive adhesive compositions and tapes.

BACKGROUND OF THE INVENTION

Water-dispersible pressure sensitive adhesive compositions are used for many applications. For example they are used for fastening cloth on mammalian body coverings. Another field of use is papermaking and printing operations. There is required splicing of the end of one roll of paper to the beginning of another roll.

Examples of such water-dispersible pressure sensitive adhesives include U.S. Pat. Nos. 3,865,770; 4,413,080 and 4,569,960 (Blake), U.S. Pat. No. 3,441,430 (Peterson) and U.S. Pat. No. 2,838,421 (Sohl). Blake discloses water-dispersible pressure sensitive adhesives for splicing carbonless paper which comprise a blend of acrylate: acrylic acid copolymers and systems which include tackifiers, plasticizers and neutralizers. Peterson discloses aggressively tacky, water-soluble adhesives composed of a copolymer of a monocarboxylic acid and an alkoxy-alkyl ester, a plasticizer having at least one ether linkage, a cross linker and up to two parts of the hydroxide of a monovalent metal ion. The hydroxide is used to neutralize sulfuric acid generated during the decomposition of a potassium persulfate catalyst used for copolymerization. Sohl discloses a mixture of water-soluble polyvinyl carboxylic acid and a compatible hydroxy-polyalkylene permanent plasticizer which retains adequate tackiness and internal, cohesive strength even when exposed for a week or more at humidities in the range of 0 to 90% relative humidity.

A variety of other pressure-sensitive adhesives are also said to be water-soluble or water-dispersible. For example U.S. Pat. No. 4,413,082 (Gleichenhagen et al.) discloses a composition comprising a copolymer of acrylic acid butyl ester and vinyl carboxylic acid and a plasticizer. The copolymer which contains free carboxyl groups is neutralized almost completely by the addition of potassium hydroxide preferably in excess. Gleichenhagen et al. discloses that neutralization with potassium hydroxide normally brings about an excellent solubility of the pressure sensitive adhesive composition in water even at widely varying pH values. Solubility is measured in water without agitation. The only time reported to achieve solubility lies between 5 and 12 minutes. The adhesives disclosed by this reference are neutralized before being solubilized. However, in acidic media the salt resulting from neutralization will convert to the acid after a relatively brief time and the resulting polymer will precipitate out of the solution. Materials being repulped often remain in the hydropulper for several hours. As a result, materials which will precipitate with time are not repulpable as described herein.

U.S. Pat. No. 4,341,680 (Hauber et al.) discloses a mixture of a copolymer of a monomeric ethyl acrylate and a monomeric $\alpha,\beta$- unsaturated aliphatic monocarboxylic acid and a tertiary, ethoxylated n-alkyl alkane diamine, where from 50% to 90% of the acid groups of the monocarboxylic acid are neutralized.

European Patent Publication 0 352 442 discloses a pressure sensitive adhesive composition for papermaking tapes. The composition is a water-soluble contact adhesive based on a polyvinyl carbonic acid with at least one softener containing a hydroxyl group with a molecular weight below 1000 and curing agents used to process paper.

U.S. Pat. No. 3,152,940 (Abel et al.) discloses a pressure sensitive adhesive composition for photographic papermaking repulpable tapes. The preferred composition is an alkali-soluble copolymer of acrylic acid ester and acrylic acid and a water-soluble wax of hydroxy polyalkylene material which remains cohesive and tacky when exposed either to dry or humid atmospheric conditions.

U.S. Pat. No. 4,388,432 (Eskay) discloses a pressure sensitive adhesive composition for making water-dispersible tapes for papermaking. The adhesive employs a copolymer of an acrylic acid compound, which is a homopolymer of acrylic acid or a copolymer of acrylic acid and esters of acrylic acid or methacrylic acid, a polyhydric alcohol plasticizer-tackifier, and a minor amount of monobasic caustic. Amounts of the base higher than 2.5 percent cause the adhesive to become elastic in nature rather than tacky.

Another water-soluble pressure sensitive adhesive for papermaking tapes is disclosed in U.S. Pat. No. 3,096,202 (deGroot von Arx). Polyvinylpyrrolidone, a polyfunctional monomeric cross-linking agent, a compatible plasticizer, and an activator catalyst to induce vinyl-type polymerization are combined to produce a water-soluble, normally tacky pressure sensitive adhesive retaining its adhesiveness after subjection to elevated temperatures.

European Patent Publication 0 297 451 (Knutson et al.) discloses a hot melt adhesive activated by moisture which is water-soluble and alkali-dispersible to be recycled with paper products. The hot melt adhesive comprises an N-acryl-polyakyleneimine and an acid functional compound.

Another water-soluble adhesive said to be useful with paper products such as decals, labels, and bumper stickers is disclosed in U.S. Pat. No. 3,763,117 (McKenna et al.). The composition which has aggressive tack and aqueous alkali removability comprises a hydroxy bearing monomer, a softening acrylate or methacrylate comonomer, and optionally, a hardening comonomer of either vinyl esters of alkanoic acids, ethyl or methyl acrylates, ethyl or methyl diesters of maleic or fumaric acids, acrylonitrile, methacrylonitrile, styrene, or vinyl chloride.

A transfer or splicing tape is disclosed in U.S. Pat. No. 3,890,292 (Bohme et al.). The tape is formed with a water-dispersible adhesive composition of ionomeric copolymers of hydrophilic and hydrophobic monomers. The ionic monomer comprises a water-soluble alkali metal salt of an $\alpha,\beta$-unsaturated monocarboxylic acid. The water-soluble non-ionic monomers are polyalkylene oxide condensation products. The composition maintains excellent tack characteristics at both high and low humidities and has improved moisture stability properties.

Yet another water-dispersible pressure sensitive adhesive is disclosed in pending U.S. patent application Ser. No. 07/580,116 (Attorney docket number 45417USA8A) filed Sep. 10, 1990. The adhesive disclosed therein is formed from a blend of (a) 100 parts by weight of a copolymer of monomers of (1) about 50–85 weight percent of at least one monomeric acrylic acid ester of nontertiary alkyl alcohol having 2–8 carbon atoms, and (2) about 50–15 weight percent of a vinyl carboxylic acid, (b) about 10 to about 250 parts by weight of a water-dispersible or water-soluble plasticizer, (c) optionally from about 0 to about 100 parts by weight of an acrylate-compatible tackifier not irritating or toxic to mammalian skin; and (d) sufficient alkali metal hydroxide, if any, to neutralize from 0 to no more than 50 percent of acid moieties in the copolymer, to cause the adhesive to retain pressure sensitive adhesive properties during exposure to moisture and body fluids yet be dispersible in aqueous alkali solutions.

These pressure sensitive adhesives are soluble or dispersible under neutral or alkaline conditions. However, they typically have poor water-solubility under acidic conditions. Moreover it is not believed that they are repulpable under acidic conditions as described herein. Accordingly a need exists for a pressure sensitive adhesive which is repulpable (defined more fully hereinafter) under acidic conditions. For example, in papermaking and finishing operations, subsequent rolls are joined together with pressure sensitive adhesives (PSA) to form an endless web. The spliced areas are removed in the mill or at the end user and recycled in the manufacturing process. The paper pulp obtained from these materials (scrap) must not be contaminated with insoluble sticky substances, originating from the PSA.

Such adhesives have to meet several requirements in order to be useful:

In several processes the splice is subjected to elevated temperatures (200° C. to 250° C.) under high shear forces. The most severe conditions are typically observed in supercalender applications. Any slippage, even fractions of millimeters could lead to blocking and subsequent web breakage.

A high cohesive strength is needed to withstand the high pressure/heat and resist sideways flowing (oozing) or penetration through the paper (bleeding).

Adequate repulpability under a variety of pH conditions including both alkaline and acidic conditions (but especially acidic conditions).

Good balanced adhesion properties (tack/peel/shear)

Useable with light weight coated (LWC) papers.

The present invention describes a pressure sensitive adhesive composition which possesses these properties. The adhesive composition is especially suitable for preparing pressure sensitive adhesive tapes which can be used in the paper industry for splicing papers. However, the adhesive can also be used for such other applications as labels, masking tapes, protective coverings, stamps and the like.

SUMMARY OF THE INVENTION

The present invention provides a pressure sensitive adhesive composition which has a pH- independent repulpability over a wide range of pH values. It has been discovered that a combination of (i) an acrylate copolymer grafted with an appropriate amount of water-dispersible segments, and (ii) selected additives provides an adhesive that is repulpable at a variety of pH values, particularly acidic pH values. The acrylate copolymer can be obtained using macromer technology. These segments help impart a pH-independent water-dispersibility to the formulation.

As used herein, the term "water-dispersible" means that the respective compositions are capable of being either dispersed in or dissolved in water alone at room temperature, such as 20° C., and atmospheric pressure.

The word "tackifier" is used herein to mean a compound which is added to the base adhesive polymer to impart or increase the ability of the adhesive to form a bond of measurable strength between two surfaces immediately upon contact of such surfaces with, at most, the application of low pressure at room temperature.

The word "plasticizer" is used herein to mean a compound which reduces the Tg of the adhesive composition and results in a better flow and rapid wetting of the adherent.

The term "macromer" is used herein to mean a macromolecular monomer which is an oligomeric polymeric material with a number average molecular weight of preferably 300 to 30,000 and having a polymerizable group.

The phrase "pressure sensitive adhesive" (PSA) is used herein to mean a composition which adheres two substrates together with, at most, the application of low pressure at room temperature.

The phrase "repulpable" is used herein to mean that the adhesive has an ERT rating (described hereinafter) of no more than 3.

The pressure sensitive adhesive composition of the present invention has several advantages. It is repulpable over a wide range a pH values as shown by reference to a European repulpability test described hereinafter. Additionally, the composition of the invention preferably shows balanced adhesive properties, like peel strength and heat resistance, as well as acceptable tack/adhesion to papers.

Tapes which utilize the pressure sensitive adhesive composition of the present invention may be provided as transfer tapes (e.g., no backing required), with a backing, etc. If a backing is employed, it may be covered on one or both sides with the pressure sensitive adhesive. The backing material may consist of a material which is repulpable under the same conditions as the pressure sensitive adhesive composition.

DETAILED DESCRIPTION

The pressure sensitive adhesive of the present invention comprises a composition which is water-dispersible segments and, therefore, repulpable over a pH range of from 2 to 11 when tested according to the European repulpability test described hereinafter. Preferably the adhesive is repulpable in a pH range of from 2 to 7.

The composition utilizes, as one essential ingredient, a terpolymer formed by the copolymerization of A, B and C monomers. Additives, such as tackifiers and plasticizers are employed as a second essential ingredient. A variety of other materials may also be employed in the adhesive as will be more fully discussed hereinafter. However, these other materials are not essential to the adhesive.

The terpolymers useful in the invention preferably have an inherent viscosity in methyl ethyl ketone of from 0.4 to 3 g/dl. Most preferably the inherent viscosity is in the range of from 0.5 to 1.5 g/dl.

The A monomer useful in preparing the terpolymer is a hydrophobic monomeric acrylic or methacrylic ester of a non-tertiary alcohol, which alcohol contains from 2 to 14 carbon atoms and preferably from 4 to 12 carbon atoms. It is preferred that the non-tertiary alcohol can be an alkyl alcohol. The term "hydrophobic" is used herein to mean that the A monomer lacks substantial affinity for water, that is it neither substantially adsorbs nor absorbs water at room temperature.

Examples of monomers suitable for use as the A monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylaclohol, 2-ethyl-1-hexanol, 1-decanol, 1-dodecanol, 1-tridecanol, 1-tetradecanol and the like. The preferred A monomer is the ester of acrylic acid with butyl alcohol or isooctyl alcohol or a combination thereof, although combinations of two or more different A monomers are suitable.

Monomer A is preferably present in an amount of 30 to 85% by weight based on the total monomer content used to prepare the terpolymer. More preferably monomer A is present in an amount of 40 to 60% by weight. It has been found that the water-dispersibility of the terpolymer, and hence that of the adhesive, drops when isooctyl acrylate is employed at a level of more than 50% by weight of the total monomers used to make the terpolymer.

The B monomer useful in preparing the terpolymer is polar and is copolymerizable with the A monomer. It has hydroxy, carboxy or sulfonic acid functionality or salts thereof. When a B monomer having a hydroxy functionality is employed, a second B monomer having an acidic group is also present.

Representative examples of monomers suitable for use as the B monomer are vinyl carboxylic acids like acrylic acid, methacrylic acid, itaconic acid, maleic acid, fumaric acid, and β-carboxyethylacrylate.

Other monomers suitable as the B monomer include a vinyl sulfonic acid. Examples of such acids are 2-arcrylamido-2-methylpropane sulfonic acid, sulfoethyl methacrylate, sulfopropyl methacrylate, sodium styrene sulfonate, N-(3-sulfopropyl)-N-methacroyloxy-ethyl-N,N-dimethyl-ammonium betaine, 1-(3-sulfopropyl)-2-vinyl-pyridinium-betaine, bis-(3-sulfopropyl)-itaconic acid ester.

Yet other useful B monomers include 2-hydroxyethylacrylate, 2-hydroxyethylmethacrylate, hydroxypropylacrylate and hydroxypropylmethacrylate. These each contain at least one hydroxy group and must be combined with a B monomer having an acidic group.

The amount of monomer B should not exceed 50% by weight of total monomers. Monomer B is preferably present in an amount of from 2 to 50% by weight. More preferably, monomer B is present in an amount of from 10 to 30% by weight based on total weight. Moreover, from 5 to 100% of the acidic groups of the B monomer are neutralized.

Several neutralizing agents, such as amines and alkali metal hydroxides, can be used for neutralization of the acidic groups of the B monomer. The neutralization not only improves the repulpability/dispersibility of the adhesive, it also increases the cohesive strength of the adhesive composition. Preferably sodium and potassium hydroxide are used as neutralizing agents. Also preferred is the use of triethanolamine as co-neutralizing agent with sodium hydroxide or potassium hydroxide. The neutralizing agents can be regarded as ionic crosslinkers. The exact quantity of neutralizing agent employed is not critical.

The cohesive strength of the adhesive can also be adjusted with carefully selected and controlled amounts of covalent crosslinkers to impart cohesiveness up to a point where the repulpability is not effected adversely. It may be desirable in some instances in the practice of the invention to increase internal strength or cohesiveness of the terpolymer by crosslinking the terpolymer using conventional methods. Any of several well known chemical crosslinking agents may also be used. Crosslinkers as further additives to the pressure sensitive adhesive compositions can be bisamide, UCAR ™ 1100 (Union Carbide) and a polyamide epichlorhydrin compound. Typical cross-linking agents of the invention are those disclosed in U.S. Pat. No. 4,418,120 (Kealy and Zink) and in U.S. Pat. No. 4,569,960 (Blake).

The C monomer useful in preparing the terpolymer is a water-dispersible macromolecular monomer. Preferably the C monomer contains only one vinyl group copolymerizable with the A and B monomers.

Typically, the C monomer contains a plurality of hydrophilic sites which impart the required hydrophilicity of the monomer. Monomer C may be represented by the general formula I $$X-Y-Z \qquad (I)$$

wherein X is a structural element comprising a moiety copolymerizable with the A and B monomers, Y is a divalent linking group, and Z is the hydrophilic site and comprises a water-dispersible polymeric moiety, i.e. one containing two or more monomer units which are essentially unreactive under free radical initiated copolymerizing conditions employed to form the pressure sensitive adhesive terpolymer.

A preferred X group of the C monomer is a vinyl group of the general formula II $$H_2C=CR^1- \qquad (II)$$

wherein $R^1$ is a hydrogen atom or a methyl group.

A preferred Y group of the C monomer is a divalent carbonyl group.

A preferred Z moiety of the C monomer is an oligomeric/polymeric material with a molecular weight of 300 to 30,000. Preferably, the Z moiety is a polyethoxyloxazoline or a poly-n-vinylpyrrolidone or a polyalkyleneoxide structure. It is also possible to use a Z compound which is a copolymer of different compounds, e.g. a N-vinylpyrrolidone and acrylamide. If such a copolymer is prepared, one of the monomers, e.g. the arcylamide is present only in minor amounts, that is less than 10% by weight.

C monomers of the type useful for the invention are not available commercially. One method of preparing C monomers uses commercially available preformed polymeric Z moieties and conventional chemical reactions for modifying them. For example, a mono-methoxypolyethlyeneglycolacrylate monomer can be prepared by esterification of a monohydroxyl-terminated poly(-lower alkylene oxide) compound in an appropriate solvent. To the solution is added a α,β-unsaturated carboxylic acid, preferably in presence of p-toluene sulfonic acid and refluxed for generally 16 to 18 hours. Excess acid is neutralized and the precipitate is filtered off.

Suitable monohydroxyl terminated poly(lower alkylene oxides) which may be used to prepare the C monomers using the above described procedure include Carbowax ™ 750, Carbowax ™ 550 and Carbowax ™ 350.

The C monomer can also be prepared by an addition reaction in which an isocyanate is reacted with a monohydroxyl or monoamine terminated poly(lower alkylene oxides) as well as other Z moieties as described above. For example a benzylisocyanate having a vinylic double bond in the side chain may be reacted with a monoamine terminated poly(lower alkylene oxide). The components are mixed and reacted for a few hours for quantitative conversion. A suitable monoamino terminated poly(lower alkylene oxide) is for example Jeffamine ™ M 600 (Texaco).

The C monomer can be also prepared by first synthesizing a suitable Z moiety and then converting it to a macromolecular monomer using known methods. For example, the Z moiety is may be formed by radical polymerization of N-vinylpyrrolidone and acrylamide in the presence of a chain transfer agent for example amino-ethanethiol, using a radical chain initiator for example azobisisobutyronitrile in an appropriate organic solvent. Then, in a second step, the X and Y moiety containing compound is reacted with the Z-moiety which bears primary amine groups as a result of the chain transfer reaction. A suitable reagent for introducing the X and Y groups is vinyl azlactone (available from SNPE, France). The vinyl-azlactone ring can be opened yielding the C monomer.

Monomer C is preferably present in an amount of from 10 to 50% by weight, preferably in the amount of 20 to 50% by weight of the total monomers.

The terpolymer is combined with one or more additive materials selected from the group consisting of tackifiers and plasticizers to form a multicomponent composition. Useful tackifiers have a glass transition temperature higher than that of the base polymer whereas useful plasticizers have a glass transition temperature lower than that of the base polymer.

The tackifier is preferably selected from the group consisting of rosin or rosin derivatives, acidic rosin or rosin derivatives and/or acidic terpenephenolic resins. The plasticizer is preferably selected from the group consisting of polyoxyethylenealkyl-phenyletherphosphate, polyoxyethylenealkyletherphosphate, polyethyleneglycolmonophenylether, octylphenoxypoly(ethyleneoxy)ethanol and/or nonylphenoxypoly(ethyleneoxy)ethanol.

The ratio of additives to terpolymer employed in the composition of the invention is in the range of 0.2:1 to 5:1. It is more preferred that the ratio be in the range of 0.5:1 to 1.5:1 and most preferred that the ratio be 1:1.

A typical procedure for preparing the pressure sensitive adhesive composition of the present invention is as follows.

The monomers A, B and C are preferably dissolved in an organic solvent, and copolymerized in presence of a radical chain initiator, such as azobisisobutyronitrile, and held at elevated temperature, such as 45 to 80° C., for several hours.

The resulting polymer solution may then be combined with the additives, e.g., the plasticizer and tackifier, and other adjuvants, e.g., the neutralizing agent and the crosslinker, if any. Alternatively, the plasticizer may be added before the polymerization process. The blended pressure sensitive adhesive composition typically comprises from about 20% to 60% by weight in the solvent. The preferred organic solvent system comprises ethyl acetate, methanol, isopropanol and water.

Pressure sensitive adhesive tape of the invention may be made by applying the pressure sensitive adhesive composition to one or more surfaces of a substrate to form a tape. Preferably the substrate is a repulpable one such as a tissue paper. The adhesive tape may also be used as a transfer adhesive fortified with fibers for easy handling.

Release liners known to those skilled in the art may cover and protect the exposed surfaces of the pressure sensitive adhesive tape between manufacturing and use. Commercially available release liners include siliconized paper release liners.

EXAMPLES

The invention is further illustrated by the following nonlimiting examples.

The following test methods were used to obtain the data set forth in the examples.

A short description of certain test procedures will facilitate the evaluation of characteristics of the repulpable pressure sensitive adhesive composition or construction.

1. Adhesion To Paper

This test measures 180° peel from paper after a dwell time of one minute. A 3.175 cm×20 cm strip of 70 gram offset coated paper (BRO glossy, available from Scheufelen and Company, Lenningen, Germany) is laminated to a 5 cm×30 cm stainless steel test panel using a double coated pressure sensitive adhesive tape. One end of a 2.54 cm×30.0 cm strip of sample tape having a 37.5 micron thick polyester backing is then laid over the offset paper. Uniform adhesive contact is assured by passing a 2 kg rubber roller over the sample at a speed of 30.5 cm/minute. The specimen is tested within one minute. The tape is then doubled back on itself and peeled from the offset paper surface at 5.08 cm/minute using PSTC-3 (modified as described above) described in TEST METHODS for pressure sensitive tapes, Pressure Sensitive Tape Counsel, 9. edition, 104 Willmot Road, Suite 201, Deerfield, Ill. 60015-5165.

2. Repulpability

Two test methods are described. One is a qualitative method and one is a quantitative method. The quantitative test method described demonstrates a recently introduced procedure. In this test method, equipment and conditions are employed which try to duplicate hydropulper conditions, i.e. blending for approximately 10 minutes at 3,000 rpm. The adhesives are repulpable if they have a water-dispersibility rating of at most 3.

2(a). Water-dispersibility Test (D)

A layer of coated adhesive is subjected to the following test. A few drops of water are sprinkled on the surface and the thus moistened surface rubbed with a finger. A water-dispersible material will become slippery and start to dissolve. This is a qualitative test which indicates the tendency of the adhesive to be repulpable.

2(b). European Repulpability Test (ERT)

Both paper and adhesive tape are conditioned at 23° C./50% relative humidity for 24 hours before running the test. 0.3 g of double coated tape to be tested is sandwiched between two strips of DIN A4 paper. Additional DIN A4 paper is added to provide a total weight of 47.3 g in order to have a tape/paper ratio of 0.6%. Under certain circumstances, 4% tape versus paper can be employed to simulate extreme conditions. The samples are cut into 1 cm by 1 cm squares and introduced into a conventional blender with 2 l of demineralized water (23° C.) resulting in a pulp content of 2.5% by weight. The pH is adjusted to the desired value with diluted sulfuric acid solution. The disintegration process is run for 10 minutes as described in detail in a publication from the Verein der Zellstoff und Papier-Chemiker und -Ingenieure (Society for Cellulose and Paper Chemists and Engineers) in their Merkblatt V/4/61 and V/6/61. The stock is then diluted with tap water up to 10 l. Paper sheets are produced from the pulp according to DIN 54 358 followed by a drying process of 10 minutes. The produced sheets are visually inspected for fiber pulling upon removal of the resulting paper sheet from the substrate. Fiber pulling upon separation, and/or presence of speckles, is indicative of a residual adhesive content Sheets are also inspected visually for adhesive nibs. After the drying operation, the top and bottom paper sheet are removed from the test sheet to observe any adhesive stringing between the test sheet and the top and/or bottom sheets. The top and/or bottom sheets are then checked for damage (fibers torn away). The number, color and size of adhesive speckles per sheet is recorded.

Perfect repulpability implies no more than one small speckle (<1 sq mm) on a sheet.

The results of the European repulpability test is rated according the following:

| | Acceptable |
|---|---|
| 1 - excellent | No piece of undispersed adhesive. |
| 2 - very good | One piece of undispersed adhesive less than 1 sq mm. |
| 3 - good | Two pieces undispersed adhesive less than 1 sq mm. |
| | Not Acceptable |
| 4 - fair | Three to five pieces of undispersed adhesive less than 1 sq mm. |
| 5 - bad | More than five pieces of undispersed adhesive less than 1 sq mm or at least one undispersed adhesive chip larger than 1 sq mm. |
| 6 - very bad | One or more original cuts of undispersed adhesive. |

The resulting ERT rating reflects the worst of four measurements.

3. Heat-resistance

This test simulates the shear forces encountered in a paper splice under elevated temperature.

The end of a 3.17 cm strip of kraft paper or coated paper of approximately 20 cm length is covered with 2.54 cm of tape at right angles. The protective liner is removed. A second strip of kraft paper is placed on top of the tape and directly in line with first strip of paper. The exposed tape is trimmed with a razor blade. The splice is rolled over once in each direction with 2 kg rubber covered roller. The test specimen is then contacted to a curved heated surface maintained at 200° C. One end of the specimen is held in a clamp to prevent it from moving during the test. The other end of the specimen is threaded over a roll and allowed to hang free with a 1,250 gram weight attached thereto so as to maintain the splice in contact with the heated surface. The time required for adhesive shear failure of the splice is then measured in seconds. The time is measured from the moment of first contact with the heated surface. This time is recorded as heat-resistance of the splicing tape. If the tape does not fail in 5 minutes, the amount of slippage during the 5 minute period is recorded.

"C" Monomer Preparation

Polymeric vinyl terminated monomer identified in the claims and herein as "C" monomer is prepared as described below. The "C" monomers are identified in the forgoing descriptions and in the Tables as "C" monomers "C-1"–"C-4". Specific details of the X, Y and Z moieties are given in Table 1. In these preparations, the term "parts" means parts by weight unless otherwise noted.

Monomer "C-1"

A mono-methoxypolyethyleneglycolacrylate monomer with a molecular weight of 750 was prepared by introducing 100 parts of Carbowax TM 750 (Union Carbide) and 100 parts of toluene to a flask which was equipped with a Dean-Stark condenser and a stirrer. The solution was heated to reflux-temperature for two hours. 11.3 parts of acrylic acid, 4.5 parts of p-toluene sulfonic acid, 3,000 ppm of Irganox TM PS 800 (Ciba-Geigy) and 500 ppm phenothiazine were added into this mixture. The solution was heated to reflux-temperature for another 16 hours. After cooling down to room temperature, excess acid was neutralized with 4.5 parts of calcium hydroxide. The formed precipitate was filtered off. Subsequently the toluene was evaporated under reduced pressure to yield a solid 100% acrylate monomer.

Monomer "C-2"

To a vessel containing 25 parts by weight of m-isopropenyl-alpha, alpha-dimethyl benzylisocyanate (TMI-Cyanamid), 75 parts of Jeffamine TM M 600 (Texaco) were added and reacted for at least 2 hours to obtain a quantitative conversion.

Monomer "C-3"

97 parts of N-vinylpyrrolidone, 3 parts of acrylamide, 4 parts of aminoethanethiol, 2 parts of azobisisobutyronitrile, 80 parts of ethylacetate and 20 parts of methanol were added to a reaction vessel provided with a condenser, nitrogen inlet and stirrer. The solution was purged with nitrogen for 10 minutes and then was refluxed for 11 hours and cooled to room temperature. 10.7 parts of 2-methyl-4,4-dimethylvinylazlactone (SNPE, France) were then introduced into the solution and a quantitative ring opening reaction was established after 30 minutes.

Monomer "C-4"

30 parts of 2-ethyloxazoline, 70 parts of dry dimethylformamide and 1.9 parts of methyltriflate were added to a polymerization bottle under nitrogen atmosphere. The polymerization reaction was carried out at 55° C. for 75 hours at which point the reaction was terminated by the addition of 10 parts of N,N-dimethylaminoethylmethacrylate. After 30 minutes the reaction mixture was precipitated in 300 parts diisopropylether. The ether layer was decanted and the residue dissolved in chloroform. This procedure was repeated twice. The presence of a poly-2-ethyloxazoline methacrylate monomer was identified by NMR-spectroscopy.

Monomer "C-5"

To a vessel containing 80 parts of Jeffamine TM M-600 (Texaco) was added 20 parts of 2-methyl-4,4-dimethylvinylazlactone. The combination was reacted at room temperature for one hour to obtain a quantative conversion.

solution was then added methanol and water to reduce viscosity and solids content.

To this solution of copolymer, the plasticizer, tackifier and neutralizing agents were sequentially blended with sufficient agitation to produce a clear solution. After removal of the solvent the residue was subjected to a repulpabiltity test. The adhesive compositions of the Examples 1-12 are given in Table II. The ERT rating, 180° peel and shear adhesion of the PSA of Table II are shown in Table IIa. Unless otherwise noted in Table IIa, the ERT rating was measured at pH of 4.5.

TABLE I

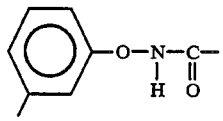

EXAMPLES 1-12

The terpolymer was prepared by mixing the designated amounts of monomers A, B and C yielding 100 g of monomeric mixture. The monomers to be copolymerized were dissolved in ethylacetate in a one liter bottle. 0.3 weight percent of 2,2-azobis-(2,4-di-methylvaleronitrile) as polymerization initiator and 10% by weight of isopropanol relative to the ethylacetate were added to the liter bottle. A nitrogen purge was introduced for two minutes at a flow rate of 1 liter/minute. The solution was held at 50° C. for 24 hours, at which time the polymerization was 99% completed. To the

TABLE II

| | | Composition of PSA | | | | | | | | | | |
|---|---|---|---|---|---|---|---|---|---|---|---|---|
| | | Terpolymer | | | | | | | Additives | | | |
| | A | | B | C | | | | | % | | | |
| Ex. | BA | IOA | AA | C-1 | C-2 | C-3 | C-4 | C-5 | i.v. | P | T | Neutr. | Neutr. Agent |
| 1 | 22.5 | 22.5 | 20* | 30 | | | | | 0.7 | 45 | 45 | 50 | NaOH/KOH/TEA 6/1/1 |
| 2 | 50 | — | 20 | — | | | | 30 | 2.24 | 50 | 50 | 50 | NaOH/KOH/TEA 6/1/1 |
| 3 | 60 | — | 15 | 25 | | | | | — | 50 | 50 | 60 | NaOH |
| 4 | 55 | — | 15 | 30 | | | | | 1.01 | 50 | 50 | 60 | NaOH |
| 5 | 60 | — | 20 | 20 | | | | | 0.99 | 50 | 50 | 45 | NaOH |
| 6 | 55 | — | 20 | 25 | | | | | 1.1 | 50 | 50 | 45 | NaOH |
| 7 | 50 | — | 20 | 30 | | | | | 0.87 | 50 | 50 | 45 | NaOH |
| 8 | — | 55 | 15 | 30 | | | | | 0.98 | 50 | 50 | 60 | NaOH |
| 9 | — | 50 | 20 | 30 | | | | | 0.83 | 50 | 50 | 45 | NaOH |
| 10 | 50 | — | 20 | — | 30 | | | | 0.81 | 50 | 50 | 75 | NaOH/KOH/TEA 6/1/1 |
| 11 | 70 | — | 10 | — | — | 20 | | | — | 0 | 25 | 100 | NaOH |
| 12 | 68 | — | 22 | — | — | — | 10 | | 1.22 | 50 | 50 | 100 | KOH |

Notes to Table II
BA = butyl acrylate
IOA = isooctylacrylate
AA = acrylic acid
i.v. = inherent viscosity of terpolymer
P = plasticizer in parts by weight based on 100 parts terpolymer
T = tackifier in parts by weight based on 100 parts terpolymer
TEA = triethanolamine
*Additionally 5 parts hydroxyethylacrylate as B monomer The plasticizers (denoted by P in Table II) were:

| Examples 1-2 | Antarox TM CA 520 (GAF) |
|---|---|
| Examples 3-9 | Gafac TM PE 510 (GAF) |
| Example 10 | Antarox TM CA 520 (GAF) |

-continued

| Example 12 | Gafac ™ PE 510 (GAF) |

The tackifier (denoted as T in Table II) was Foral ™ AX in each Example where tackifier was present.

TABLE II a

| Ex. | Repulpability ERT | D | 180° Peel (N/dm) | Heat Resistance Shear (sec) | Slippage (mm) |
|---|---|---|---|---|---|
| 1 | 1 | + | 33.2 | 300+ | <0.25 |
| 2 | 1* |  | 25-27 | 300+ | 0.25 |
| 3 | 1 |  |  | 300+ | 1.0 |
| 4 | 1 |  | 29.9 | 300+ | 0.5 |
| 5 | 1 |  | 23.2 | 300+ | 0.5 |
| 6 | 1 |  | 29.9 | 300+ | <0.5 |
| 7 | 1 |  | 34.3 | 300+ | 0.25 |
| 8 | 4 |  | 35.4 | 300+ | <0.5 |
| 9 | 1 |  | 33.2 | 300+ | 0.25 |
| 10 | 1* |  | 29.9 | 300+ | <0.25 |
| 11 |  | + |  | 300+ | 0 |
| 12 |  | + |  | 300+ |  |

*pH of 7

EXAMPLES 13-22

A terpolymer was prepared comprising BA/AA/C-1 (50/20/30 parts by weight) in each of the examples 13 to 21. The terpolymer of Example 22 had a composition of 55/15/30 parts by weight BA/AA/C-1. The terpolymers were prepared in the same manner as that of examples 1 to 12. The tackifier was Foral ™ AX in an amount of 50 parts by weight. 50 parts by weight of the respective plasticizers was present. The neutralization was performed so that 75% of the acid functionality was neutralized with NaOH/KOH in a ratio of 3 to 1.

Table III illustrates the correlation between the molecular structure of the plasticizer and adhesion/heat-resistance properties. The evaluated plasticizers can be divided in two classes, i.e. ionic and nonionic. Each class can further be split into components with hydrophobic base aliphatic, aromatic-aliphatic or aromatic groups. The names listed in the table are from top to bottom GAFAC ™ (GAF):
  PE-510, RE-410, RM-410,
  polyoxyethylenealkylphenylether-phosphate;
  RB-400, RS-410, polyoxyethylenealkyletherphosphate
PYCAL 94 (ICI) polyethyleneglycol monophenylether
ANTAROX ™ (GAF)
  CA-520, CA-420, octylphenoxypoly(ethyleneoxy)ethanol
  CO-430, nonylphenoxypoly(ethyleneoxy)ethanol The GAF Antarox ™ CA-520 plasticizer tends to generate the overall best properties. Also other types of low glass transition temperature water-solubledispersible materials can be employed as plasticizing agents, e.g. polyvinylmethylether (Lutonal ™ -BASF), polyethyleneoxide, propyleneoxide block copolymers (Pluronic ™ -BASF) and polyethylene and propylene glycols (Carbowax ™ (Union Carbide)), Breox ™ (BP Chemicals).

TABLE III

Evaluation of Plasticizers
Transfer adhesives - 1 mil (0.0254 mm)

| Ex. | P | Heat resistance Shear (sec) | Slippage (mm) | 180° Peel (N/dm) |
|---|---|---|---|---|
| 13 | PE-510 | >300 | <0.25 | 42.3 |
| 14 | RE-410 | >300 | 0.25 | 45.6 |

TABLE III-continued

Evaluation of Plasticizers
Transfer adhesives - 1 mil (0.0254 mm)

| Ex. | P | Heat resistance Shear (sec) | Slippage (mm) | 180° Peel (N/dm) |
|---|---|---|---|---|
| 15 | RM-410 | >300 | <0.25 | 45.0 |
| 16 | RB-400 | >300 | 0.25 | 15.7 |
| 17 | RS-410 | >300 | 0.5 | 24.9 |
| 18 | PYCAL 94 | >300 | 0.25 | 45.6 |
| 19 | CA-520 | >300 | 0.25 | 27.5 |
| 20 | CA-420 |  | AF | — |
| 21 | CO-430 |  | AF | — |
| 22 | RM-410 | >300 | 0.25 | 54.4 |

P = Plasticizer
AF = adhesive failure

A rosin-based resin with an acid moiety, (Foral ™ AX (Hercules)) was evaluated as a tackifier. Through neutralization of the acid function of the tackifier it is possible to produce water-dispersible compounds. This class of tackifiers is suitable as acrylate-compatible resins.

On certain types of paper, insufficient initial adhesion was observed. This shortcoming was improved substantially by using alkanolamine such as triethanolamine as co-neutralizing agent. This is shown by Table IV.

EXAMPLES 23-27

A base polymer of IOA/BA/AA/C-1 (25/25/20/30 parts by weight) was prepared according to examples 1 to 12 using Foral ™ AX and Antarox ™ CA-520. 10 or 15 parts of acrylic acid were neutralized with sodium hydroxide, potassium hydroxide and/or triethanolamine (TEA) in the ratios given in the parentheses of Table IV. The 180° peel adhesion (N/dm) were measured on double-coated tapes, each sample being coated with 31 grams per square meter on each side of the test specimen.

TABLE IV

| Ex | % Neutralization | Agent | 180° Peel Adhesion (N/dm) |
|---|---|---|---|
| 23 | 50 | NaOH | 12.2-15.5 |
| 24 | 75 | NaOH/KOH (3/1) | 14.4-17.7 |
| 25 | 75 | NaOH/TEA (3/1) | 22.1-25.4 |
| 26 | 75 | NaOH/TEA (2/1) | 33.2-36.5 |
| 27 | 75 | NaOH/KOH/TEA (6/1/1) | 25.4-29.9 |

I claim:

1. A pressure sensitive adhesive composition comprising
    (a) a terpolymer formed from A, B and C monomers wherein,
    A is a hydrophobic monomer selected from the group consisting of acrylic or a methacrylic ester of a non-tertiary alcohol, the alcohol having 2 to 14 carbon atoms, wherein A comprises from 30 to 85% by total weight of the A plus B plus C;
    B is a polar monomer copolymerizable with said A monomer and having hydroxyl, carboxyl, sulfonic acid functionality or combinations thereof, with the proviso that if B contains the hydroxyl functionality it is combined with a monomer having an acid group, wherein B comprises from 2 to 50% by total weight of A plus B plus C, and wherein from 5 to 100% of any said acidic group has been neutralized; and C is a water-dispersible macromolecular monomer which is copolymerizable with A and B and has the formula X—Y—Z wherein X is a structural element comprising a moiety which is copolymerizable with A and B, Y is a divalent linking group joining X to Z, and Z is a water-dispersible moiety containing at least two units which are essentially unreactive under free radical initiated copolymerization conditions used to form the terpolymer, wherein C comprises from 10 to 50% by total weight of A plus B plus C; and (b) an additive selected from the group consisting of tackifiers, plasticizers, and combinations thereof wherein the ratio of said additive to said terpolymer is in the range of from 0.2:1 to 5:1 wherein said composition is repulpable at a pH of from 2 to 11.

2. The adhesive according to claim 1 where the A monomer is selected from said acrylic or methacrylic ester of said non-tertiary alcohol.

3. The adhesive according to claim 1 wherein the non-tertiary alcohol is selected from butyl and isooctyl alcohol.

4. The adhesive according to claim 1 wherein the B monomer is a vinyl carboxylic acid selected from the group consisting of acrylic acid, methacrylic acid, itaconic acid, maleic acid, fumaric acid, β-carboxyethylacrylate, salts of these monomeric acids and combinations thereof.

5. The adhesive according to claim 1 where the polar B monomer contains at least one vinyl sulfonic acid functionality selected from the group consisting of 2-acrylamido-2-methylpropane sulfonic acid, sulfoethyl methacrylate, sulfopropyl methacrylate, sodium styrene sulfonate, N-(3-sulfopropyl)-N-methacroyloxyethyl-N,N-dimethyl-ammonium betaine, 1-(3-sulfopropyl)-2-vinylpyridinium-betaine, bis-(3-sulfo-propyl)-itaconic acid ester, salts of these monomers, and combinations thereof.

6. The adhesive according to claim 1 wherein the B monomer is a combination of (i) one or more hydroxy functional materials selected from the group consisting of hydroxyethylacrylate, hydroxypropyl-acrylate, hydroxyethylmethacrylate and hydroxypropyl-methacrylate and (ii) and acidic group containing material selected from the group consisting of acrylic acid, methacrylic acid and an acid with vinyl sulfonic functionality.

7. The adhesive according to claim 1 where the C monomer has a molecular weight of 300 to 30,000.

8. The adhesive according to claim 1 wherein the Z portion of the C monomer is selected from the group consisting of polyethyloxazoline, N-vinylpyrrolidoneacrylamide copolymer, and a polyalkyleneoxide copolymer, and combinations thereof.

9. The adhesive of claim 1 wherein said tackifier has a glass transition temperature higher than said terpolymer and said plasticizer has a glass transition temperature lower than said terpolymer.

10. The adhesive of claim 9 where the tackifier is selected from the group consisting of rosin and rosin derivatives, acidic rosin and rosin derivatives, acidic terpenephenolic resins, and combinations thereof.

11. The adhesive of claim 9 where the plasticizer is selected from the group consisting of polyoxyethylenealkyl-phenyletherphosphate, polyoxyethylenealkylether-phosphate, polyethyleneglycolmonophenylether, octylphenoxypoly(ethyleneoxy)ethanol, nonylphenoxypoly(ethyleneoxy)ethanol, and combinations thereof.

12. A crosslinked adhesive according to claim 1.

13. The adhesive of claim 1 further comprising a neutralizing agent selected from the group consisting of alkanol amines, water-soluble/dispersible alkali metal hydroxides and combinations thereof.

14. The adhesive of claim 1 wherein said terpolymer has an inherent viscosity of from 0.4 to 3.0.

15. Process for the preparation of a pressure sensitive adhesive of claim 1, comprising the steps of:

copolymerizing the monomers A, B and C in presence of a radical chain initiator, adding to the formed copolymer, a plasticizer, tackifier, a neutralizing agent and optionally, a crosslinking agent, in an organic solvent system comprising ethyl acetate, methanol, isopropanol and optionally water.

16. Pressure sensitive adhesive tape comprising the composition of claim 1.

17. Pressure sensitive adhesive tape of claim 16 having at least one pressure sensitive adhesive composition of claim 1 on a backing layer.

18. Pressure sensitive adhesive tape of claim 16 being a transfer or splicing tape for paper industries.

19. A substrate bearing a layer of a pressure sensitive adhesive tape according to claim 1.

20. A repulpable splice comprising at least two sections of paper joined together by a pressure sensitive adhesive according to claim 1.

* * * * *